(12) United States Patent
Stronski et al.

(10) Patent No.: US 12,439,953 B2
(45) Date of Patent: Oct. 14, 2025

(54) MACHINE FOR WRAPPING A SMOKABLE MATERIAL IN A WRAPPER, A FEEDING DEVICE FOR THE MACHINE, AND A SMOKABLE PRODUCT THEREFROM

(71) Applicant: Swisher International, Inc., Jacksonville, FL (US)

(72) Inventors: Jim Stronski, Jacksonville, FL (US); Johnny David Collum, Jacksonville, FL (US)

(73) Assignee: SWISHER INTERNATIONAL, INC., Jacksonville, FL (US)

( * ) Notice: Subject to any disclaimer, the term of this patent is extended or adjusted under 35 U.S.C. 154(b) by 735 days.

(21) Appl. No.: 17/245,461

(22) Filed: Apr. 30, 2021

(65) Prior Publication Data

US 2021/0337858 A1 Nov. 4, 2021

Related U.S. Application Data

(60) Provisional application No. 63/018,051, filed on Apr. 30, 2020.

(51) Int. Cl.
*A24C 5/18* (2006.01)
*A24C 5/28* (2006.01)
(Continued)

(52) U.S. Cl.
CPC .......... *A24C 5/1871* (2013.01); *A24C 5/1807* (2013.01); *A24C 5/1857* (2013.01);
(Continued)

(58) Field of Classification Search
None
See application file for complete search history.

(56) References Cited

U.S. PATENT DOCUMENTS

| 3,968,904 A | 7/1976 | Neville |
| 3,980,088 A | 9/1976 | Brackman |

(Continued)

FOREIGN PATENT DOCUMENTS

| CN | 87103233 A | 11/1987 |
| CN | 1315836 A | 10/2001 |

(Continued)

OTHER PUBLICATIONS

Chinese issued Office Action dated Sep. 2, 2022 regarding the parallel Chinese Patent Application No. 202110482910.8, 5 Pages.

*Primary Examiner* — Katherine A Will
(74) *Attorney, Agent, or Firm* — LUCAS & MERCANTI, LLP

(57) ABSTRACT

A machine for wrapping smokable material in a wrapper includes a garniture defining a straight path along a longitudinal axis on which a wrapper is guided. A garniture belt transports the wrapper along the straight path. A feeding device for feeding a smokable material to the garniture includes a first conveyor having an upper section on which the smokable material is supported, the first conveyor being actuatable to move the smokable material in a feed direction toward a downstream side of the first conveyor. A holding container has a bottom defined at least partially by the first conveyor. A feed transports the smokable material from a supply container to the holding container so that that an amount of smokable material in the holding container is maintained within a range including a predetermined minimum amount and a predetermined maximum amount. A metering device meters the amount of smokable material that is moved by the first conveyor from the holding container toward the garniture.

21 Claims, 7 Drawing Sheets

(51) Int. Cl.
  *A24C 5/39* (2006.01)
  *A24D 1/18* (2006.01)
  *A61K 36/185* (2006.01)

(52) U.S. Cl.
  CPC ............... *A24C 5/28* (2013.01); *A24C 5/399* (2013.01); *A24D 1/18* (2013.01); *A61K 36/185* (2013.01)

(56) References Cited

U.S. PATENT DOCUMENTS

| | | | |
|---|---|---|---|
| 4,446,876 | A | 5/1984 | Brackman |
| 4,700,719 | A | 10/1987 | Sheahan |
| 4,889,143 | A | 12/1989 | Pryor |
| 6,510,855 | B1 | 1/2003 | Korte |
| 2001/0003987 | A1 | 6/2001 | Okumoto |

FOREIGN PATENT DOCUMENTS

| | | | |
|---|---|---|---|
| WO | 2019183128 | A1 | 9/2019 |
| WO | 2020016660 | A2 | 1/2020 |

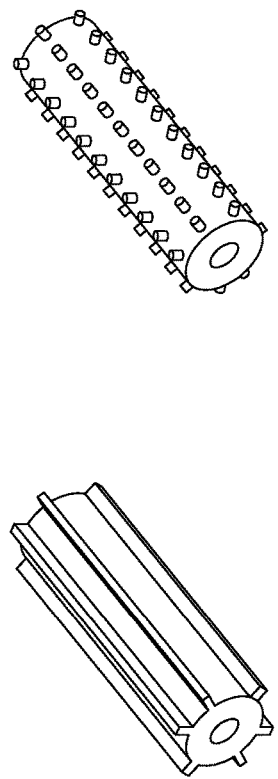
FIG. 9
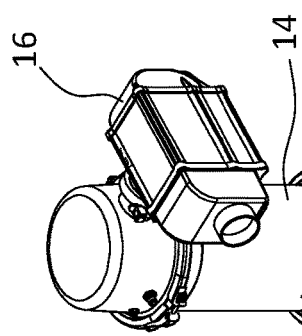
FIG. 8
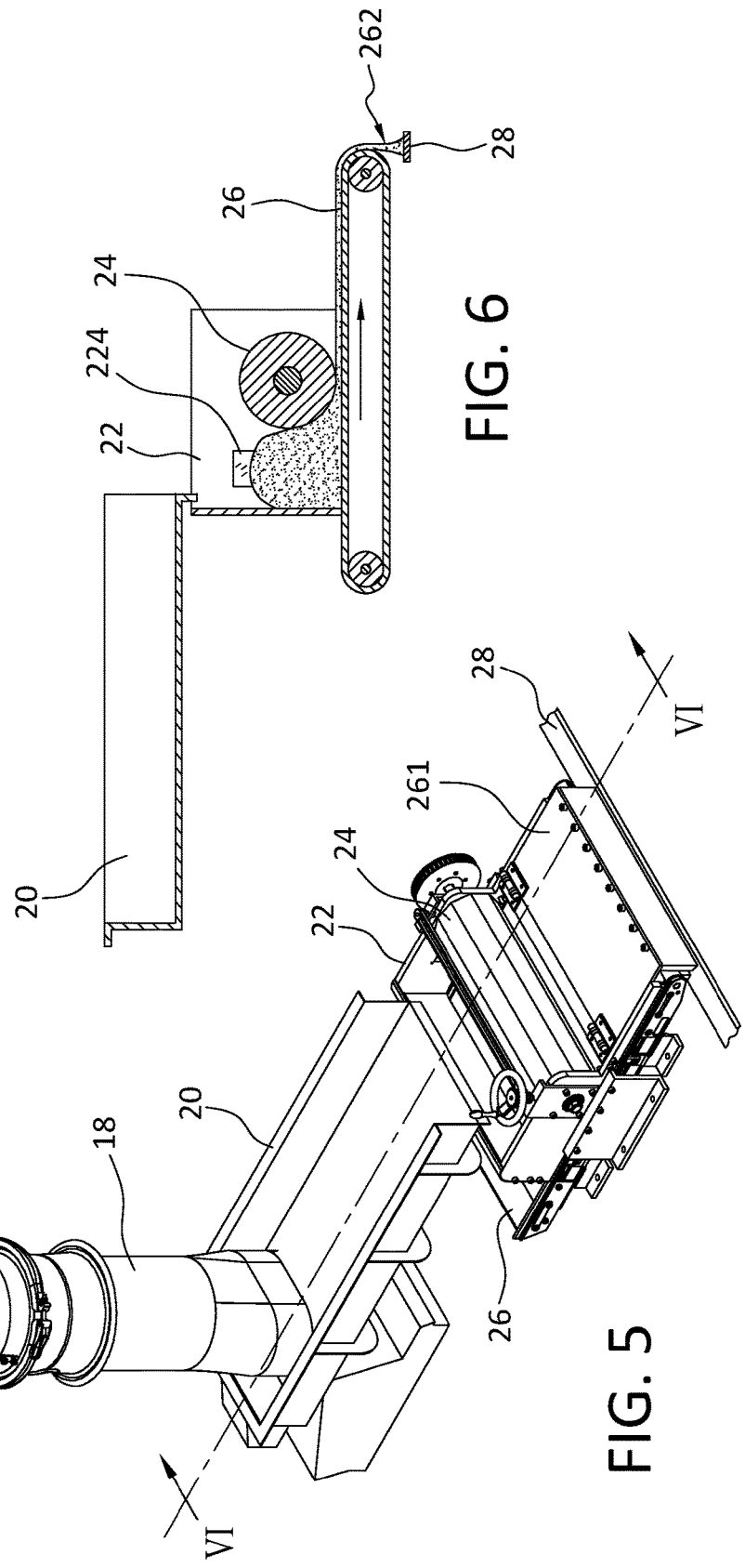
FIG. 6
FIG. 5

MACHINE FOR WRAPPING A SMOKABLE MATERIAL IN A WRAPPER, A FEEDING DEVICE FOR THE MACHINE, AND A SMOKABLE PRODUCT THEREFROM

CROSS-REFERENCE TO RELATED APPLICATIONS

The present application claims priority to US Provisional Patent Application 63/018,051, filed on Apr. 30, 2020.

BACKGROUND OF THE INVENTION

The present invention relates to a machine for wrapping a smokable material in a wrapper, a feeding device for feeding the smokable material in the machine, and a smokable product of the machine.

As cannabidiol (CBD) gains in reputation as a treatment for various ailments, demand for hemp cigarettes or smokable hemp sticks is growing. However, it is difficult to use conventional cigarette manufacturing machines and processes to make the hemp sticks because of the differences in characteristics between the tobacco used for cigarettes and the smokable materials used to make a hemp stick. More specifically, the smokable materials used to make a hemp stick have a higher resin content than tobacco used for conventional cigarettes and can stick to and foul various components of the conventional cigarette making machines rendering the conventional machines inoperable or at the very least requiring high maintenance costs for frequent cleaning of the components.

The conventional cigarette machines use drums with pins and air blowers to aerate the tobacco and move the tobacco toward a porous belt at the top of a chamber. As air is drawn through the porous belt, the tobacco is held against a bottom of the belt by a vacuum pressure. The belt conveys the tobacco toward a former or forming tongue in which the tobacco is inserted into cigarette paper. Immediately before the tobacco is inserted into the paper, a cutting device cuts tobacco product at a certain distance below the belt so that a uniform amount of tobacco is delivered to the cigarette wrapper, i.e., paper. The resin in the hemp material sticks to the pins on the rollers and blocks screens for air delivery and air removal. Further, the resin in the hemp material blocks the porous belt. Some manufacturers have tried to fine tune the existing cigarette machines and processes to make them usable for processing smokable materials. However, the resin in the hemp material still causes problems in the components used for delivering the smokable material to the former or forming tongue.

Another problem with smokable hemp material is that the seeds and stems of the hemp plant are difficult to separate from the remainder of the plant. The seeds and stems are not desirable in the product to be smoked. In addition, the seeds and stems can make the manufacturing process difficult because the seeds and stems can puncture the wrapper as the hemp cigarettes are being formed.

BRIEF SUMMARY OF THE PRESENT INVENTION

An object of the present invention is to provide a feeding device and a process for feeding a smokable product, and a machine for making smokable rods that overcomes the problems of the prior art.

The object is met by a feeding device for feeding a smokable material to a garniture in a machine for wrapping the smokable material in a wrapper, the feeding device including a first conveyor having an upper section on which the smokable material is supported, the first conveyor being actuatable to move the smokable material in a feed direction toward a downstream side of the first conveyor, a holding container having a bottom defined at least partially by the first conveyor, a feed configured to transport the smokable material from a supply container to the holding container so that that an amount of smokable material in the holding container is maintained within a range including a predetermined minimum amount and a predetermined maximum amount. In addition, a metering device is configured to meter the amount of smokable material that is moved by the first conveyor from the holding container toward the garniture.

In one embodiment, the first conveyor is a feeding belt.

The metering device meters the smokable material released from the holding container so that the smokable material is evenly distributed on a width of the first conveyor. According to one embodiment of the invention, the metering device is a roller having a polygonal cross section. An axis of rotation perpendicular to the feed direction of the first conveyor. The polygonal cross section is preferably an octagon. However, other polynomial shapes may also be used. As a further alternative, the roller may have blades, paddles, teeth, or other projections on an outer surface thereof.

The metering device is rotated so that a surface of the roller facing the first conveyor moves upstream.

A distance between the roller and the first conveyor is adjustable.

The feed includes a second conveyor that deposits the smokable material into the holding container.

In one embodiment, the feed includes a vacuum system including an airlock, vacuum system configured to draw the smokable material from a supply container to the airlock. The feed may further include a separator disposed between the container and the airlock to remove unwanted elements from the smokable material.

The airlock accumulates the smokable material and releases the smokable material in batches. The airlock may be configured to release the smokable material directly to the holding container.

According to another embodiment including the second conveyor, the feed includes a vacuum system including an airlock, and is configured to transfer the smokable material from a supply container to the airlock, the airlock accumulates the smokable material and releases the smokable material in batches, and the airlock releases the smokable material to the second conveyor.

In one embodiment, the second conveyor is a vibratory conveyor.

A sensor at the first conveyor upstream of the metering device senses a level of smokable material in the holding container, wherein the secondary conveyor is operated in response to the sensor.

The object is also met by a machine for wrapping smokable material in a wrapper includes a garniture defining a straight path along a longitudinal axis on which a wrapper is guided. A garniture belt transports the wrapper along the straight path. A feeding device for feeding a smokable material to the garniture includes a first conveyor having an upper section on which the smokable material is supported, the first conveyor being actuatable to move the smokable material in a feed direction toward a downstream side of the first conveyor. A holding container has a bottom defined at least partially by the first conveyor. A feed transports the smokable material to the holding container so that that an amount of smokable material in the holding container is maintained within a range including a predetermined minimum amount and a predetermined maximum amount. A metering device meters the amount of smokable material that is moved by the first conveyor from the holding container toward the garniture.

The smokable material falls off of the downstream side of the first conveyor onto the garniture by a waterfall transfer, the downstream side of the conveyor having a straight end aligned with the straight path of the garniture.

In one embodiment, the machine includes a compression wheel arranged on the garniture downstream of the belt, the compression wheel configured to compress the smokable material deposited onto the garniture, and a forming tongue configured to further compress the smokable material and insert the smokable material into the wrapper. The compression wheel compresses the smokable material so that the smokable material downstream of the compression wheel has a volume per length that is ¼ or less than a volume per length of the smokable material upstream of the compression wheel.

The machine further includes a folding and gluing station for folding and gluing the wrapper to form a continuous rod including the wrapper and the smokable material contained therein, and a cutter for cutting the continuous rod to sticks of predetermined length. In one embodiment, the compression wheel compresses the smokable material so that the smokable material downstream of the compression wheel has a volume per length that is ¼ or less than a volume per length of the smokable material upstream of the compression wheel.

The feed includes a vacuum system including an airlock, the vacuum system configured to draw the smokable material from a supply container to the airlock. The airlock releases the smokable material directly to the holding container.

In another embodiment, the feed includes a second conveyor that deposits the smokable material into the holding container, and the airlock releases the smokable material onto the second conveyor.

Another object of the present invention is to make a smokable product by using the machine and the feeding device for the machine, where the product is the smokable material, i.e., cut hemp plant material and/or cut hemp buds, wrapped in hemp paper wherein the smokable material is compressed longitudinally by ¼ or less per volume per longitudinal length. Such a product has a uniform longitudinal compression and a uniform draw when smoking. More preferably, the compression is ¼ to ¹⁄₁₆ by volume, longitudally.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 5 is a perspective view of a mechanical portion of a feed device of the machine of FIG. 1;

FIG. 6 is a sectional view of the mechanical portion of FIG. 4;

FIG. 8 is a perspective view of another embodiment of a metering roller;

FIG. 9 is a perspective view of yet another embodiment of the metering roller;

DETAILED DESCRIPTION OF THE PREFERRED EMBODIMENTS

Figure 1:
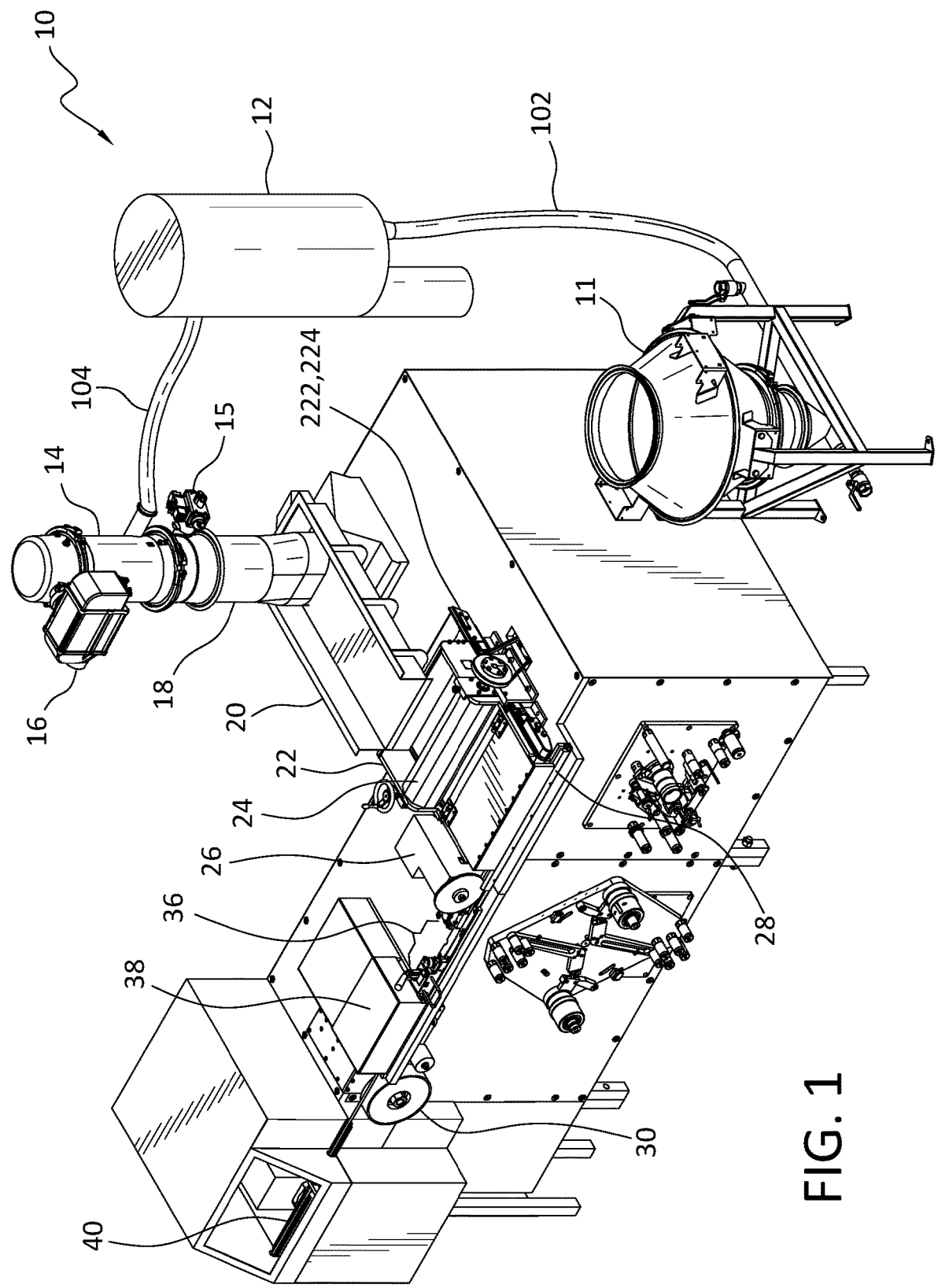
FIG. 1 is a perspective view of a machine for manufacturing smokable rods according to the present invention.
Figure 2:
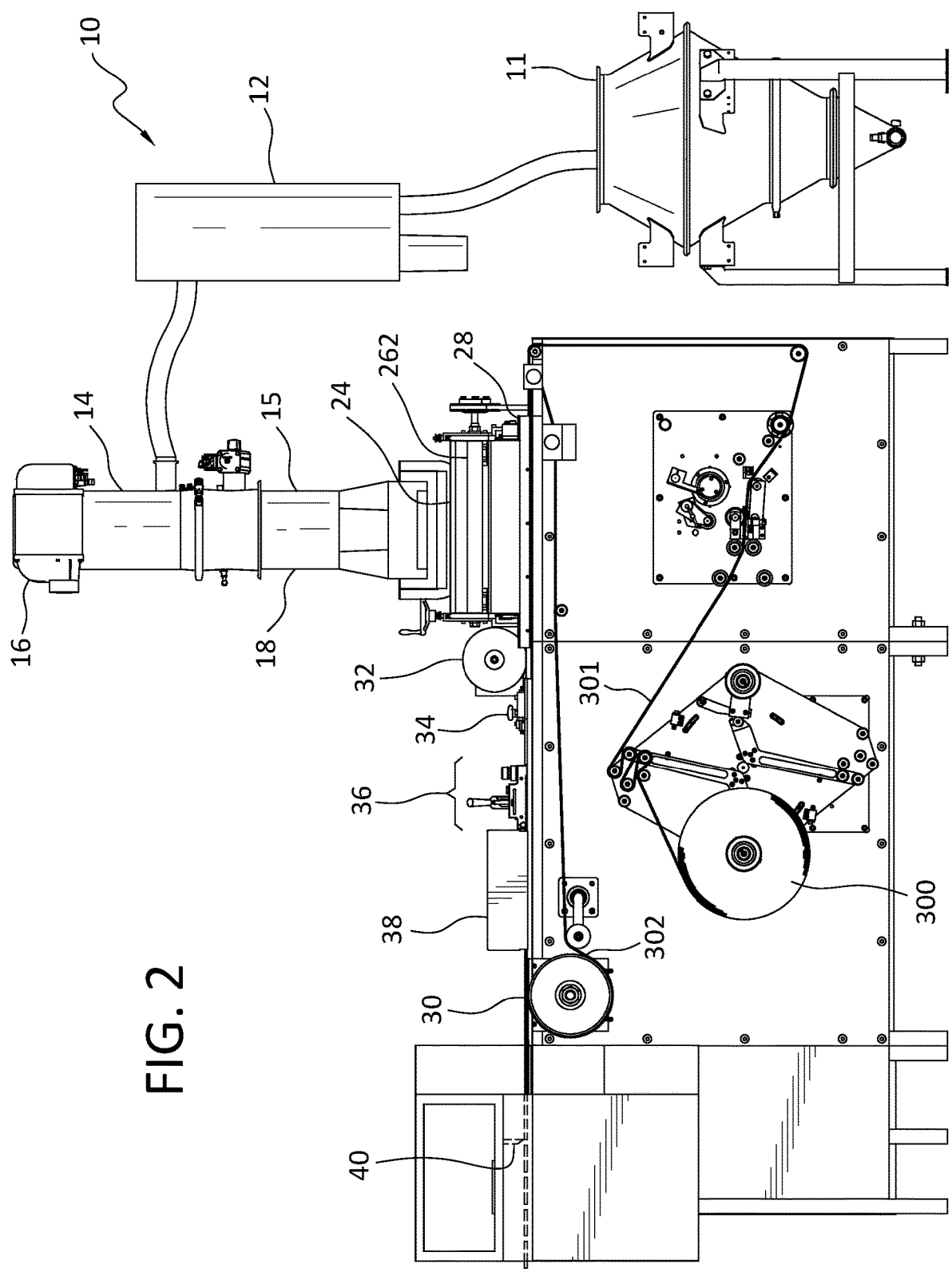
FIG. 2 is a front view of the machine of FIG. 1.
Figure 3:
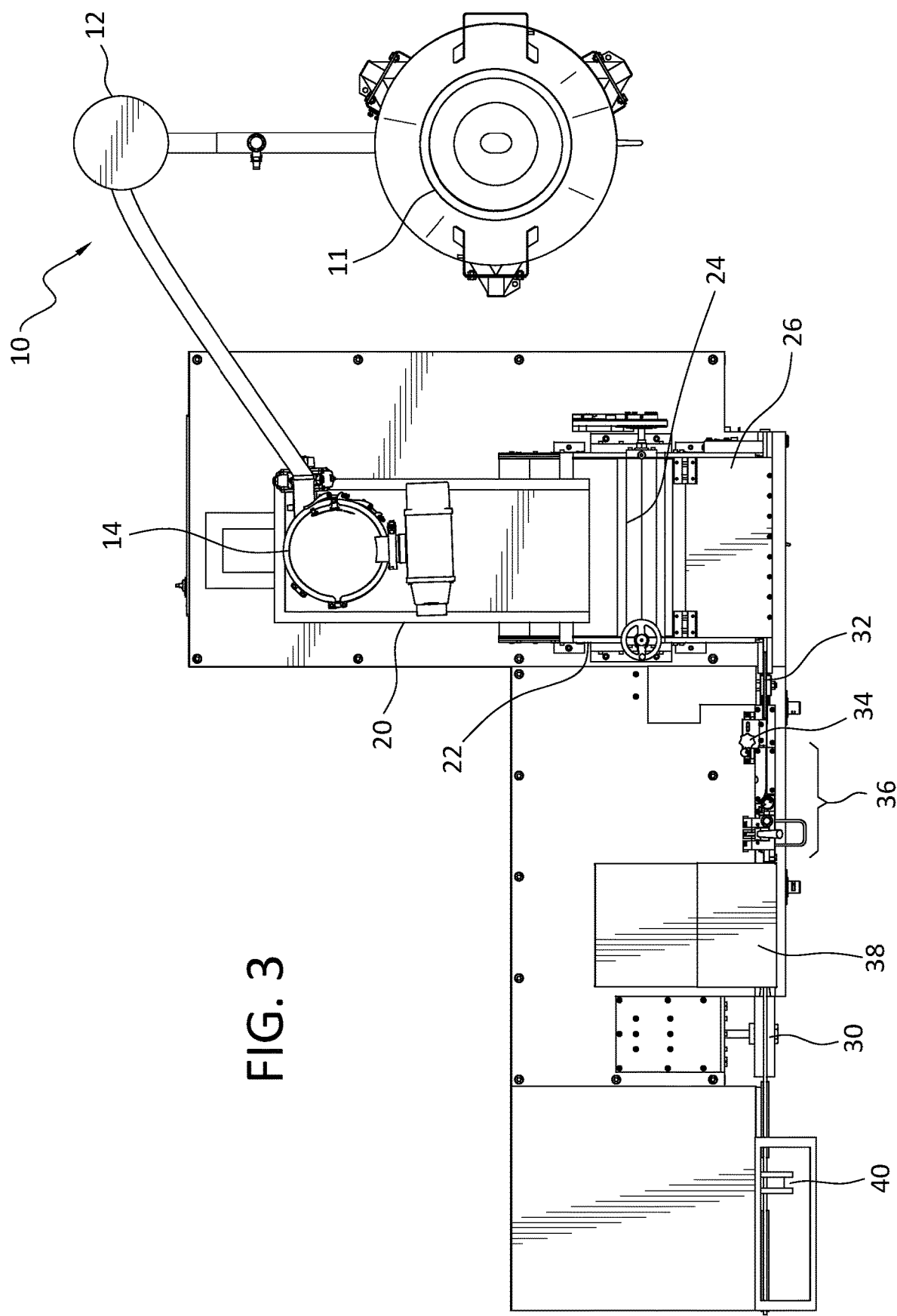
FIG. 3 is a top view of the machine of FIG. 1.

According to FIGS. 1-3, a supply container 11 holds a smokable material to be wrapped in a wrapper to form a smokable rod. In a preferred embodiment, the smokable material is hemp plant material. However, the invention may also be used with other smokable materials including, for example, tobacco and herbal plant materials.

According to the invention, a vacuum system 10 including a vacuum 16 draws the smokable material from the supply container 11 though a separator 12 and into an airlock 14. A strength of the vacuum 16 is adjusted so that undesirable portions of the smokable material such as, for example, seeds and stems, are separated in the separator 12 and only the desirable portion of the smokable material is delivered to the air lock 14. As will be described in more detail below, the air lock 14 releases the smokable material to a metering tube 18, which directs the smokable material onto a conveyor including a vibratory conveyor 20 and a feeding belt 26. In the embodiment shown in FIGS. 1-3, the vibratory conveyor 20 delivers the smokable material to a holding container 22 arranged above a rear end of the feeding belt 26. A metering device 24 is arranged above the feeding belt 26 and allows a metered amount of the smokable material to pass on the feeding belt 26 toward a garniture 28. The metered amount of the smokable material is transported to an end of the feeding belt 26 and deposited on a wrapper 301 being guided along the garniture 28. The wrapper 301 is preferably a hemp rolling paper. However, any other smokable wrapper such as conventional rolling paper may be used. The wrapper 301 is moved through the garniture 28 by a garniture belt 302, which is driven by a rubber coated wheel 30. After being deposited on the garniture 28, the smokable material is subjected to a two-step compression. As described in more detail below, the smokable material is first compressed by a compression wheel 32 and is then further compressed by a forming tongue 34. The wrapper 301 is then folded and glued in a folding and gluing station 36, subjected to heat in a heater 38, and then cut to length by a cutter 40.

Figure 4:
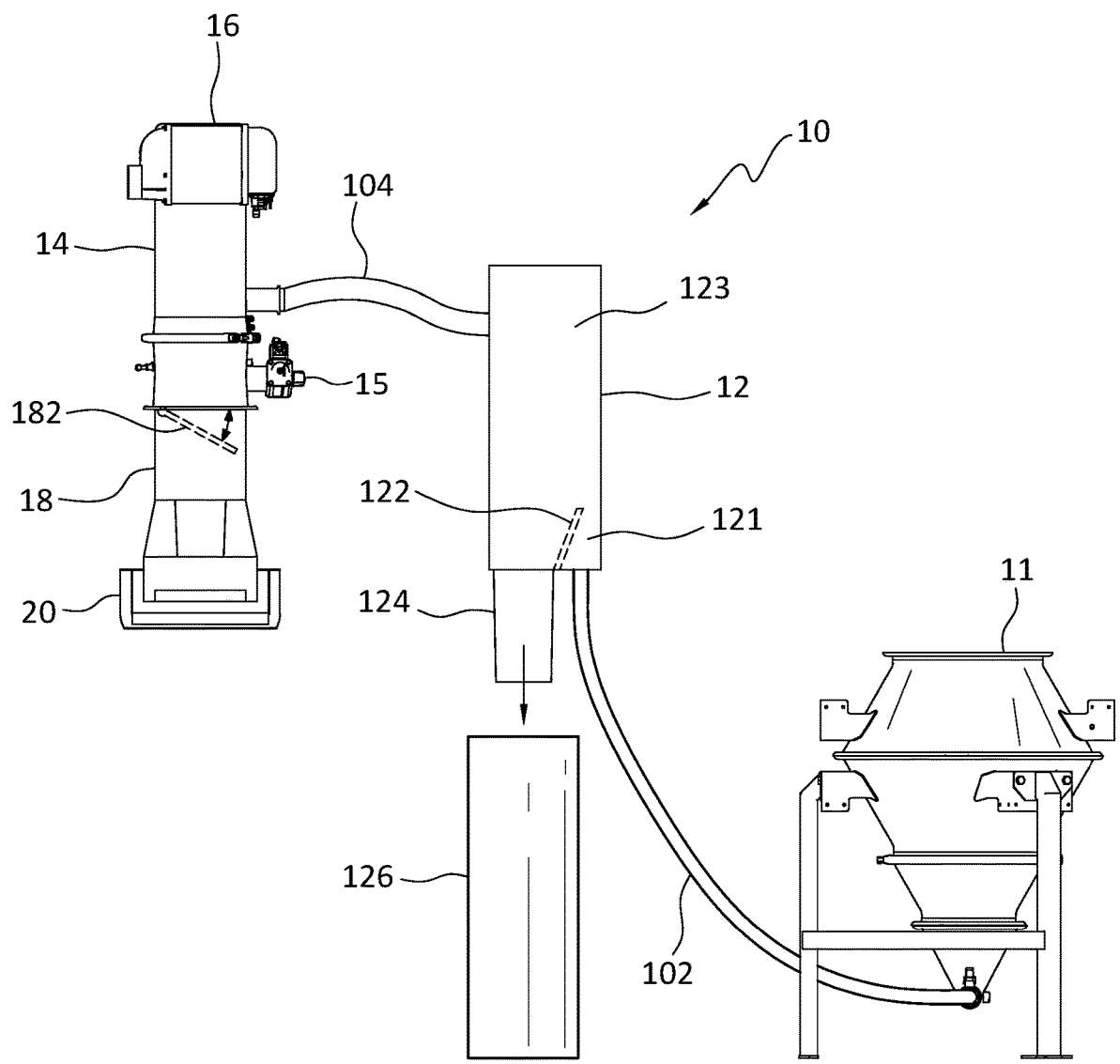
FIG. 4 is a schematic diagram of a vacuum delivery portion of the machine of a feed device of the machine of FIG. 1.

FIG. 4 is a more detailed view of the vacuum system 10 that delivers the smokable material from the supply container 11 to the vibratory conveyor 20. The vacuum 16 creates a negative pressure in the air lock 14 that draws the smokable material from the supply container 11 through a hose 102 to an entrance chamber 121 of the separator 12 formed by a guide 122 in the separator. After the smokable material exits the entrance chamber 121 and enters a main chamber 123 of the separator 12, the draw pressure decreases due to the larger size of the main chamber 123. This allows undesirable heavier components such as, for example, stems and seeds to fall out of a refuse egress 124 into a collector 126. The desirable remainder of the smokable material is drawn through hose 104 into the airlock 14. In one specific embodiment, a diameter of each of the hoses 102 and 104 is two inches and the diameter of the main chamber is six inches.

A sensor 15 such as, for example, a photoeye sensor, is used to monitor the smokable material collected in the airlock 14. When a sufficient amount of smokable material is collected in the airlock 14, a flap 182 opens to release the smokable material into the metering tube 18, which delivers the smokable material onto the vibratory conveyor 20. The vacuum 16 is, for example, a piab® vacuum system and the vacuum pressure is adjustable so that the stems and seeds or other undesirable components can be properly removed. The adjustability of the vacuum 16 is advantageous because different batches of smokable materials can have different characteristics depending on the source. For example, some batches may have drier smokable materials than others or may have a higher content of stems and/or seeds.

FIGS. 5 and 6 depict the portion of the machine that delivers the smokable material from the vibratory conveyor 20 to the garniture 28. After the smokable material is dumped onto the vibratory conveyer 20, the smokable material is moved by vibration to an open end of the vibratory conveyor and deposited into the holding container 22. The feeding belt 26 rotates to move the smokable material toward the garniture 28. However, the metering device 24 allows only a metered amount to be moved toward the garniture 28. The metering device 24 is a metering roller having an octagonal cross section. Instead of an octagonal cross section, the metering may have longitudinal fins, blades or teeth on an outer circumferential surface as shown in FIG. 8, or projections on the outer circumferential surface thereof as shown in FIG. 9. The portion of the metering device 24 that faces the feeding belt 26 rotates counter to the direction of the feeding belt 26. At the end of the feeding belt 26, the smokable material is deposited onto the garniture by a waterfall transfer 262 in which the smokable material simply falls off of the end of the feeding belt 26 and onto the garniture 28. FIG. 5 shows a cover 261 over the feeding belt to help avoid contamination of the smokable product. The cover is not shown in FIG. 6.

As shown in FIG. 2, the wrapper 301 is unwound from a roll 300 and pulled through the garniture on the garniture belt 302. As the wrapper 301 is pulled through the garniture 28, the smokable material is deposited on the wrapper 301 at the end of the feeding belt 26 by the waterfall transfer 262. Downstream of the feeding belt 26, the smokable material is compressed under the compression wheel 32. The circumferential outer surface of the compression wheel 32 is concave. The smokable material downstream of the compression wheel 32 is compressed by the compression wheel 32 to ¼ or less of the volume upstream of the compression wheel. The pressure exerted by the compression wheel 32 is adjustable to accommodate different batches of smokable material with different characteristics. The smokable material is then further compressed by the forming tongue 34 and wrapped in the wrapper 301 by the folding and gluing station 36 to form a rod of smokable material that is wrapped in the wrapper 301. The formed rod is then directed through a heater 38 and a cutter 40 to cut the rod into the proper lengths. The folding and gluing station 36, the heater 38, and the cutter 40 can be conventional.

Figure 7:
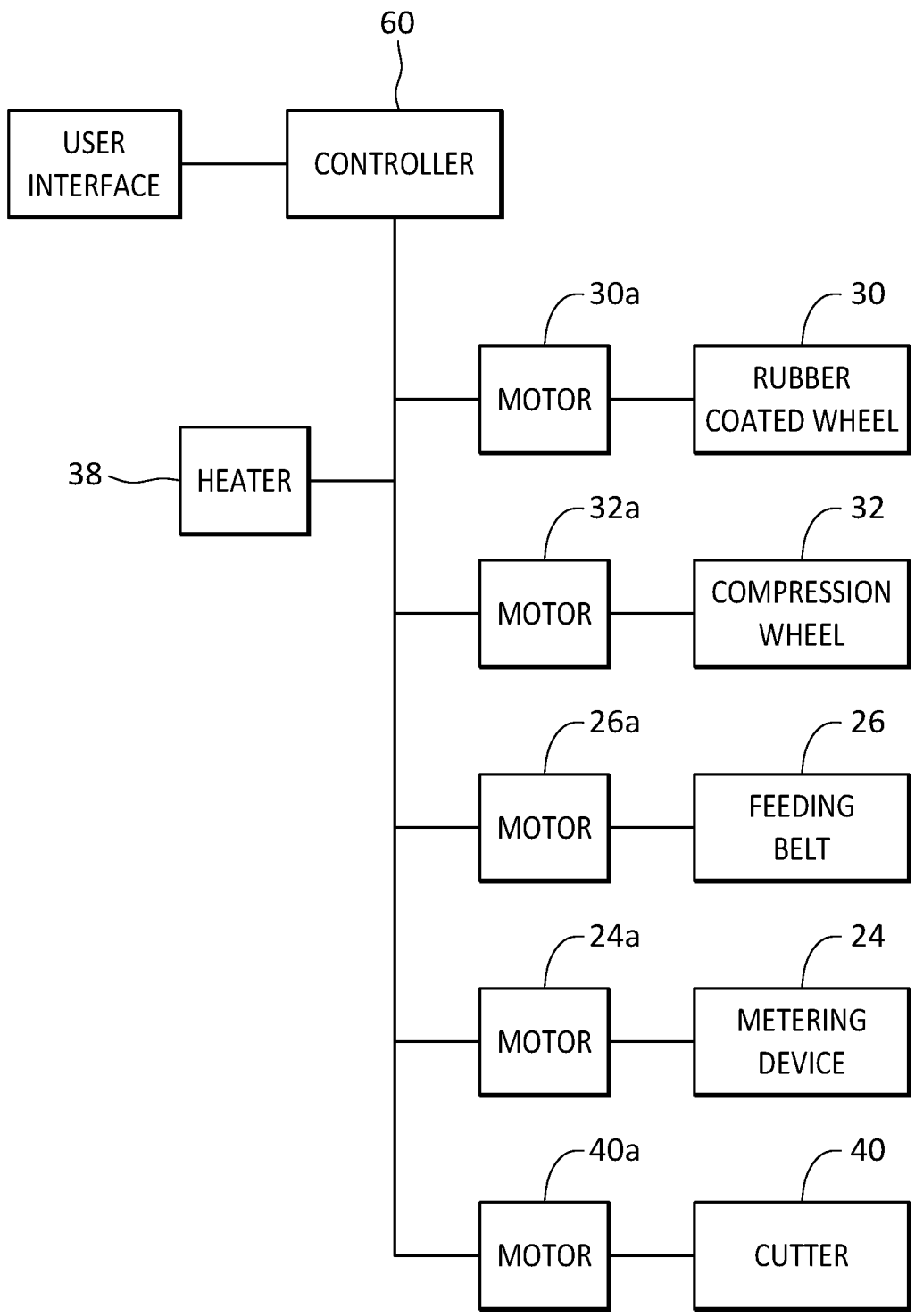
FIG. 7 is a schematic diagram showing a controller of the machine of FIG. 1.

FIG. 7 shows that a controller 60 is used to control the speed of motors 24a, 26a, 30a, 32a, and 40a to control a speed of the metering device 24, a speed of the feeding belt 26, a speed of the rubber coated wheel 30, a speed of the rotation of the compression wheel 32, and a speed of the cutter 40. The controller 60 also controls the heater 38. The controller 60 includes a microprocessor and memory for storing a program and data. The controller controls the various motors 24a, 26a, 30a, 32a, and 40a and heater 38 in accordance with the program. A user interface 62 is connected to the controller and allows a user to input commands to the controller. The user interface 62 allows the user to increase or decrease an overall speed of the machine. Alternatively or additionally, the user interface 62 allows a user to adjust the individual speeds of the motors 24a, 26a, 30a, 32a, and 40a. The user interface may include a touchscreen and/or buttons or keys for increasing and decreasing the speeds. Preferably, each of the motors 24a, 26a, 30a, 32a, and 40a is an individually controlled servo motor.

Instead of using individual motors on each component, at least some or all of the components could be driven by a common motor. For example, the metering device 24, the feeding belt 26, the rubber coated wheel 30, the compression wheel 32, and/or the cutter 40 could be driven by a common motor and connected by pulleys and belts, gears, sprockets and chains, and/or a combination thereof. The use of a single common motor simplifies maintenance and servicing of the machine.

Further adjustments include an adjustment of a height of the metering device 24 and an adjustment of the compression wheel 32. As shown in FIG. 5, the adjustment of the metering device 24 can be accomplished by a handcrank that is connected to adjust both sides of the roller of the metering device 24. As an alternative, the adjustment of the height of the metering device 24 could be accomplished by a servomotor. Similarly, the adjustment of the compression wheel 32 may be accomplished by adjusting threaded fasteners or by a servo motor.

To ensure that the feeding belt 26 delivers a uniform amount of the smokable material per unit length of the wrapper that passes through the garniture, which ensures that the rod has a uniform amount of smokable material per unit length, the amount of smokable material in the holding container is kept between a minimum level and a maximum level. This level is monitored by a sensor 222 that determines a level. The sensor 222 is an electric eye sensor that monitors the level through a window 224 on a side of the holding container 22 (see FIG. 1).

The vibratory conveyor 20 is used to maintain the proper level of the smokable material in the holding container. Instead of a vibratory conveyor 20, a conveyor belt or other conveyor device may be used that can convey the smokable material in the required amount to maintain the proper level. In some embodiments, the vibratory conveyor 20 may even be dispensed with so that the vacuum system 10 delivers the smokable material directly to the holding container 22. In this case, the airlock 14 and metering tube 18 must be sized to deliver the required amount of the smokable material to the holding container 22.

Figure 10:
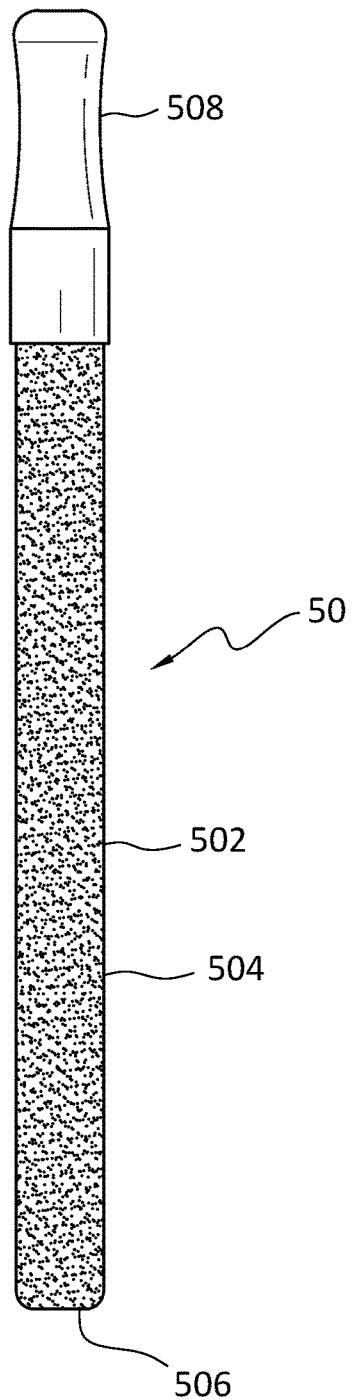
FIG. 10 is a side view of a product formed by the machine.
Figure 11:
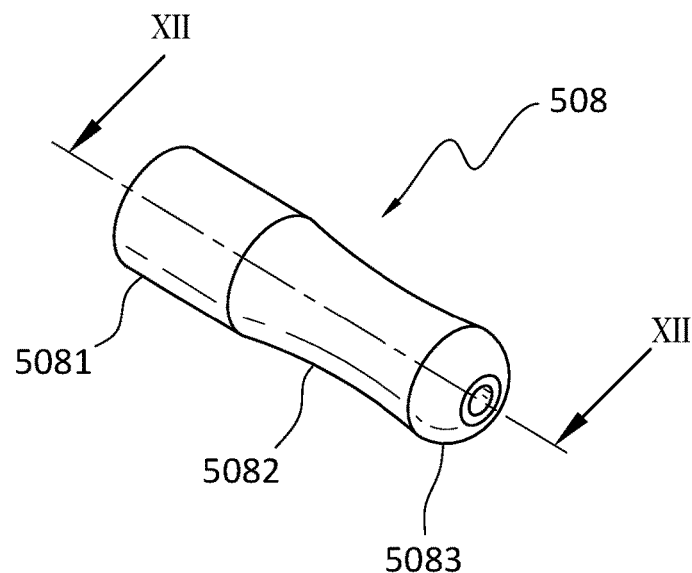
FIG. 11 is a perspective view of a tip used for the product of FIG. 10.
Figure 12:
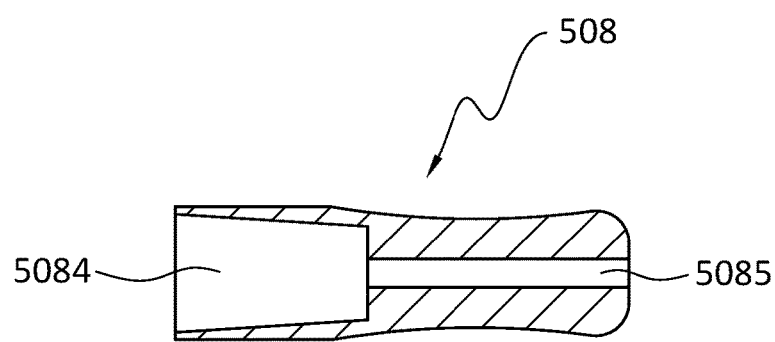
FIG. 12 is a sectional view of the tip of FIG. 11.

FIG. 10 illustrates smokable hemp product 50, having a hemp stick 502 with hemp paper wrapper 504 with cut hemp buds 506 wrapped inside hemp paper wrapper 504. An optional mouthpiece 508 is fitted to one end of hemp stick 502. FIGS. 11 and 12 show a specific embodiment of the mouthpiece 508 with an outer circumference that includes a first end section 5081 facing the hemp stick, a rounded second end section 5083, and a center section 5082 between the first end section 5081 and the second end section 5083. The first end section 5081 is substantially cylindrical. The second section decreases from each end to a minimum diameter in a center thereof. The mouth piece 508 has a hemp stick receiving space 5084 in the first end section 5081 that extends into the center section 5082. The receiving space 5084 tapers from a maximum diameter to a minimum diameter. In a specific embodiment, the maximum diameter of the receiving space 5084 is 0.31 inches and the minimum diameter is 0.25 inches. A through hole 5085 connects the receiving space 5084 to the second end section 5083.

Thus, while there has been shown and described and pointed out the fundamental novel features of the invention is applied to a preferred embodiment thereof, it will be understood that various omissions and substitutions and changes in the form and details of the devices illustrated, and in their operation, may be made by those skilled in the art without departing from the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A feeding device for feeding a smokable material to a garniture in a machine for wrapping the smokable material in a wrapper, comprising:
    a first conveyor having an upper section on which the smokable material is supported, the first conveyor being actuatable to move the smokable material in a feed direction toward a downstream side of the first conveyor;
    a holding container having a bottom defined at least partially by the first conveyor;
    a feed configured to transport the smokable material to the holding container so that an amount of smokable material in the holding container is maintained within a range including a predetermined minimum amount and a predetermined maximum amount;
    a metering device configured to meter the amount of smokable material that is moved by the first conveyor from the holding container toward the garniture,
    wherein the metering device includes a roller, an axis of rotation of the roller is perpendicular to the feed direction of the first conveyor, and a distance between the roller and the first conveyor is adjustable to meter the amount of smokable material that is moved by the first conveyor from the holding container to the garniture.

2. The feeding device of claim 1, wherein the first conveyor is a feeding belt.

3. The feeding device of claim 1, wherein the metering device meters the smokable material released from the holding container so that the smokable material is evenly distributed on a width of the first conveyor.

4. The feeding device of claim 1, wherein the roller has a polygonal cross section, longitudinal undulations on an outer surface, or projections on the outer surface.

5. The feeding device of claim 4, wherein the metering device is rotated so that a surface of the roller facing the first conveyor moves upstream.

6. The feeding device of claim 1, wherein the feed includes a second conveyor that deposits the smokable material into the holding container.

7. The feeding device of claim 6, wherein the feed includes a vacuum system including an airlock, the vacuum system is configured to transfer the smokable material from a supply container to the airlock, the airlock accumulates the smokable material and releases the smokable material in batches, and the airlock releases the smokable material to the second conveyor.

8. The feeding device of claim 6, wherein the second conveyor is a vibratory conveyor.

9. The feeding device of claim 6, further comprising a sensor at the first conveyor upstream of the metering device that senses a level of smokable material in the holding container, wherein the second conveyor is operated in response to the sensor.

10. The feeding device of claim 1, wherein the feed includes a vacuum system including an airlock, the vacuum system being configured to draw the smokable material from a supply container to the airlock.

11. The feeding device of claim 10, further comprising a separator disposed between the container and the airlock to remove unwanted elements from the smokable material.

12. The feeding device of claim 10, wherein the airlock accumulates the smokable material and releases the smokable material in batches.

13. The feeding device of claim 10, where the airlock releases the smokable material directly to the holding container.

14. A machine for wrapping smokable material in a wrapper, comprising:
    a garniture defining a path along a longitudinal axis on which a wrapper is guided;
    a garniture belt configured to transport the wrapper along the path; and
    a feeding device for feeding a smokable material to the garniture, the feeding device comprising:
        a first conveyor having an upper section on which the smokable material is supported, the first conveyor being actuatable to move the smokable material in a feed direction toward a downstream side of the first conveyor;
        a holding container having a bottom defined at least partially by the first conveyor;
        a feed configured to transport the smokable material to the holding container so that that an amount of smokable material in the holding container is maintained within a range including a predetermined minimum amount and a predetermined maximum amount;
        a metering device configured to meter the amount of smokable material that is moved by the first conveyor from the holding container toward the garniture,
        wherein the metering device includes a roller, an axis of rotation of the roller is perpendicular to the feed direction of the first conveyor, and a distance between the roller and the first conveyor is adjustable to meter the amount of smokable material that is moved by the first conveyor from the holding container to the garniture.

15. The machine of claim 14, wherein the smokable material falls off of the downstream side of the first conveyor onto the garniture by a waterfall transfer, the downstream side of the conveyor having a straight end aligned with the straight path of the garniture.

16. The machine of claim 14, further comprising:
a compression wheel arranged on the garniture downstream of the belt, the compression wheel configured to compress the smokable material deposited onto the garniture; and
a forming tongue configured to further compress the smokable material and insert the smokable material into the wrapper.

17. The machine of claim 16, further comprising:
a folding and gluing station for folding and gluing the wrapper to form a continuous rod including the wrapper and the smokable material contained therein; and
a cutter for cutting the continuous rod to sticks of predetermined length.

18. The machine of claim 16, wherein the compression wheel compresses the smokable material so that the smokable material downstream of the compression wheel has a volume per length that is ¼ or less than a volume per length of the smokable material upstream of the compression wheel.

19. The machine of claim 14, wherein the feed includes a vacuum system including an airlock, the vacuum system configured to draw the smokable material from a supply container to the airlock.

20. The machine of claim 19, wherein the airlock releases the smokable material directly to the holding container.

21. The machine of claim 19, wherein the feed includes a second conveyor that deposits the smokable material into the holding container, and the airlock releases the smokable material onto the second conveyor.

* * * * *